United States Patent [19]

Hill et al.

[11] Patent Number: 4,625,442
[45] Date of Patent: Dec. 2, 1986

[54] CATTLE STUNNING GUN

[76] Inventors: Richard C. Hill, 300 W. College, Independence, Mo. 64015; Roger J. Hancox, 4 Blythe Close, Church Farm, Burntwood, Staffordshire, England

[21] Appl. No.: 612,901

[22] Filed: May 22, 1984

[51] Int. Cl.⁴ .............................................. A22B 3/02
[52] U.S. Cl. ...................................... 42/1.12; 17/1 B; 42/70.02
[58] Field of Search ................... 42/1 M, 2, 1 Z, 1 G, 42/1 H, 1 J, 1 K, 1 L; 17/1 B; 81/44, 463, DIG. 12; 124/27, 37, 80, 21, 22, 26

[56] References Cited

U.S. PATENT DOCUMENTS

| 2,580,356 | 12/1951 | Martin | 124/37 |
|---|---|---|---|
| 3,009,452 | 11/1961 | Barber et al. | 124/27 |
| 3,067,454 | 12/1962 | Catlin et al. | 42/1 M |
| 3,068,601 | 12/1962 | Arrowsmith | 42/1 M |
| 3,609,901 | 3/1969 | Necas | 42/1 M |
| 4,531,322 | 7/1985 | Termet | 42/1 M |

FOREIGN PATENT DOCUMENTS

| 163245 | 6/1949 | Austria | 42/1 M |
|---|---|---|---|
| K14592 | 1/1956 | Fed. Rep. of Germany | 17/1 B |
| 948756 | 10/1949 | France | 42/1 M |
| 58904 | 3/1922 | Sweden | 42/1 M |

Primary Examiner—Deborah L. Kyle
Assistant Examiner—Michael J. Carone
Attorney, Agent, or Firm—Kokjer, Kircher, Bradley, Wharton, Bowman & Johnson

[57] ABSTRACT

A stunning gun in which a captive bolt is extended by an explosive cartridge detonated by a trigger controlled firing pin. The trigger is a push button device having a rounded surface and a shape and construction to avoid catching the finger of the gun operator. A piston on the trailing end of the bolt has a cupped recess in its end face to concentrate the explosive driving force and prevent it from spreading unduly to erode the firing chamber. A retaining collar acted on by a spring holds the bolt in its retracted position and releases the bolt when the gun is fired. A pull which is gripped to pull the firing pin to its cocked position is spring loaded to absorb forces applied to the end of the firing pin.

6 Claims, 9 Drawing Figures

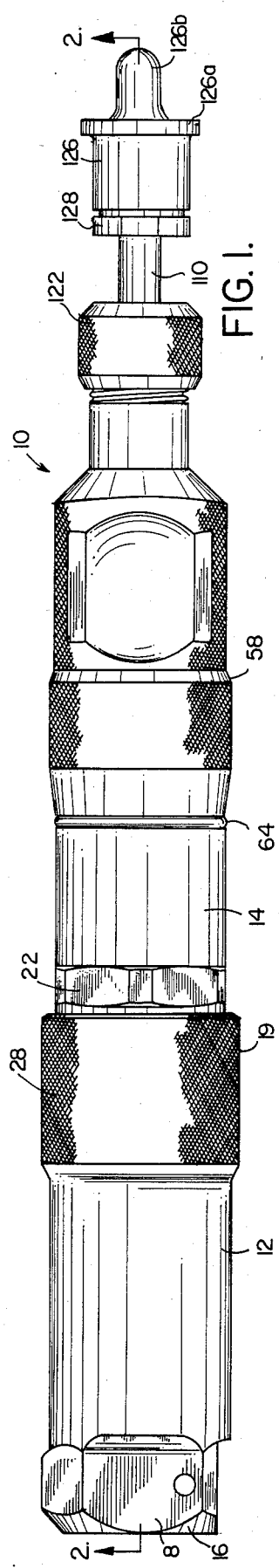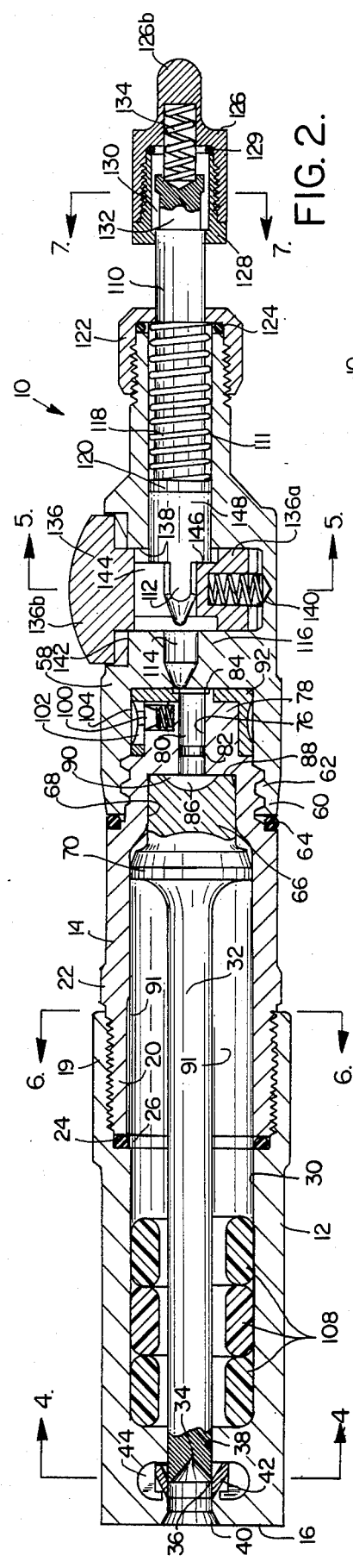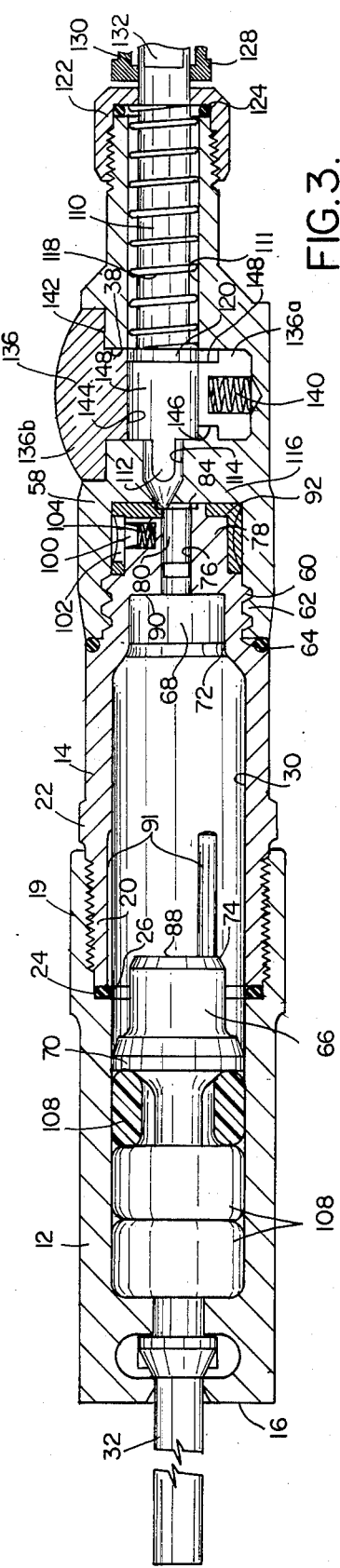

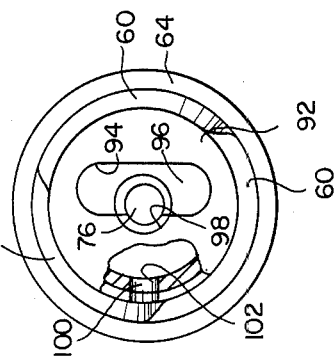
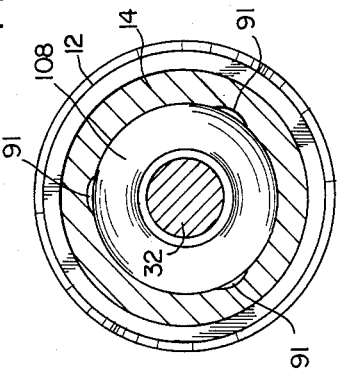
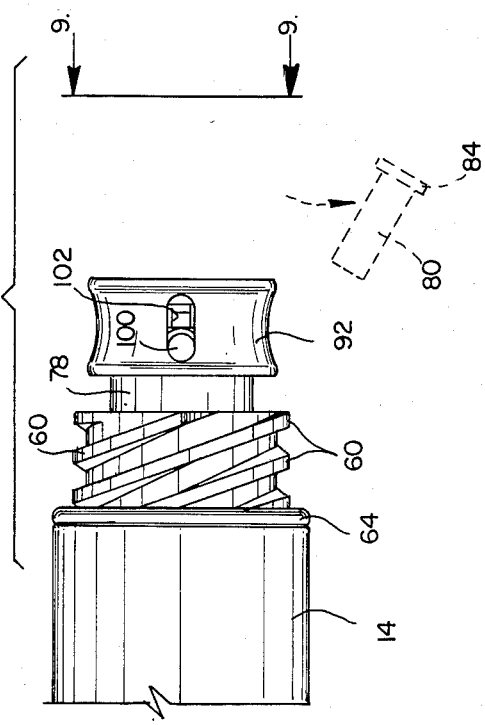
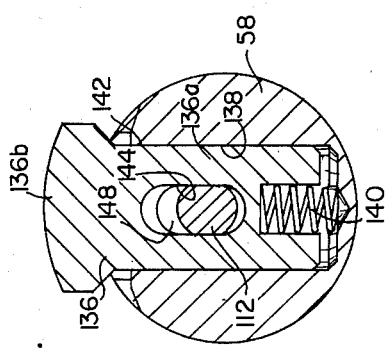
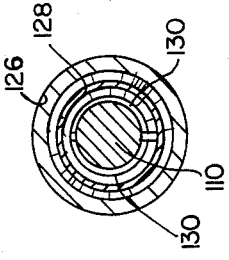
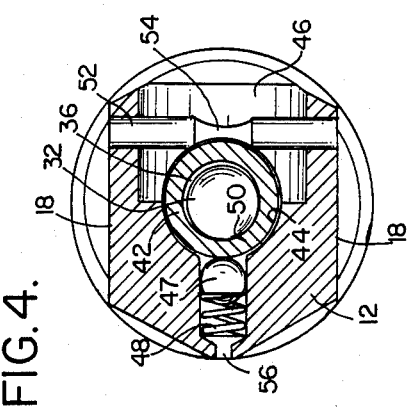

CATTLE STUNNING GUN

BACKGROUND AND SUMMARY OF THE INVENTION

This invention relates to improvements in stunning guns used for the stunning of cattle.

The stunning guns that have been used in the past have been less than satisfactory in a number of respects, most notably in their lack of safety. Stunning guns typically include a bolt which is forcefully extended into the head of the animal when an explosive cartridge is fired by a trigger controlled firing pin. In guns which have a lever operated trigger, it is not uncommon for the operator to catch his finger between the lever and the gun body, thereby causing sometimes severe injury to the finger and hand area. Another safety problem is that the gun can fire and possibly cause injury if it is accidentially dropped or otherwise carelessly handled.

The stunning guns that have been used in the past are lacking somewhat in stunning power due to their inability to efficiently utilize the force of the exploding powder charge. When the cartridge explodes, the expanding gases can escape past the bolt and are not fully applied to cause extension of the bolt. Consequently, the bolt does not always extend with enough force to provide the necessary stunning power. The powder charge often burns incompletely, and this further detracts from the stunning power and also creates excess carbon residue and other fouling of the firing chamber. When the explosive force is not adequately confined, it causes rapid deterioration of the walls of the firing chamber and wear on the adjacent parts of the gun. This tendency for the parts to wear quickly reduces the operating life of the gun and requires replacement at frequent intervals.

The stunning guns that are currently used in the industry are difficult to maintain in good working order, due primarily to the time and difficulty involved in disassembling the gun for inspection and servicing of its various components. Problems with misfiring and jamming of cartridges make existing guns unreliable and slow down the entire operation. Also, shells are sometimes difficult to remove from the gun, particularly when the shell is jammed or misfired.

It is the principal goal of the present invention to provide a stunning gun which minimizes the safety problems and the operator and maintenance problems that have plagued other guns.

More specifically, it is an important object of the invention to provide a stunning gun in which the trigger mechanism is constructed in an improved manner to avoid catching on the fingers or otherwise injuring the fingers or hand of the operator. In contrast to guns having lever operated triggers, the gun of the present invention has a specially shaped push button trigger which does not catch the finger and yet can be easily and safely operated.

Another important object of the invention is to provide a stunning gun which makes efficient use of the force of an exploding cartridge to propel the bolt to its extended position. The bolt is equipped with a piston having a cupped recess in its end face which confines the force of the explosive charge and prevents it from spreading out unduly in the firing chamber. This results in effective application of the explosive force to the bolt and also prevents erosion of the firing chamber wall and adjacent parts. At the same time, the cupped shape of the recess creates swirling motion of the combustion gases to result in a more complete burn for enhanced efficiency and reduced build up of carbon and other undersirable deposits.

Still another object of the invention is to provide a stunning gun in which blows applied to the firing pin are safely absorbed.

A further object of the invention is to provide a stunning gun in which the bolt is firmly held in its retracted position and yet is not unduly hindered from extending when the gun is fired.

An additional object of the invention is to provide a stunning gun having a bolt which is able to easily penetrate even bony areas of an animal.

Yet another object of the invention is to provide a stunning gun in which the bolt is easily withdrawn from the animal and is not opposed in its return movement by excessive back pressure.

A still further object of the invention is to provide a stunning gun in which unfired and misfired cartridges can be quickly and easily removed from the firing chamber in a safe manner.

Other and further objects of the invention, together with the features of novelty appurtenant thereto, will appear in the course of the following description.

DESCRIPTION OF THE DRAWING

In the accompanying drawings which form a part of the specification and are to be read in conjunction therewith and in which like reference numerals are used to indicate like parts in the various views:

FIG. 1 is a side elevational view of a stunning gun constructed according to a preferred embodiment of the present invention, with the firing pin pulled to its cocked position;

FIG. 2 is a sectional view taken generally along line 2—2 of FIG. 1 in the direction of the arrows;

FIG. 3 is a fragmentary sectional view similar to FIG. 2 but showing the firing pin in the fired position and the bolt in its extended position;

FIG. 4 is a sectional view on an enlarged scale taken generally along line 4—4 of FIG. 2 in the direction of the arrows;

FIG. 5 is a sectional view on an enlarged scale taken generally along line 5—5 of FIG. 2 in the direction of the arrows;

FIG. 6 is a sectional view on an enlarged scale taken generally along line 6—6 of FIG. 2 in the direction of the arrows;

FIG. 7 is a sectional view on an enlarged scale taken generally along line 7—7 of FIG. 2 in the direction of the arrows;

FIG. 8 is a fragmentary side elevational view on an enlarged scale showing the end of the breech with the breech cap removed and the extractor operated to eject a cartridge shell shown in broken lines; and FIG. 9 is an end elevational view taken generally along line 9—9 of FIG. 8 in the direction of the arrows, with portions broken away for purposes of illustration.

DETAILED DESCRIPTION OF THE INVENTION

Referring now to the drawings in more detail and initially to FIGS. 1–3, numeral 10 generally designates a stunning gun constructed in accordance with a preferred embodiment of the present invention. The stunning gun 10 has a body formed by a barrel 12 and a breech 14 which are threaded together. The barrel 12 has a muzzle end 16 provided with flat surfaces 18 for receiving a wrench to facilitate connection and disconnection of the breech and barrel. The end of barrel 12 opposite the muzzle end 16 is enlarged somewhat as indicated by numeral 19 and is provided with internal threads to receive an extenally threaded end 20 of the breech. Adjacent the threaded end 20, the breech 14 is provided with flats 22 for receiving a wrench or similar tool. When the breech is tightly threaded into the barrel, a nylon lock washer 24 is tightly squeezed between the end of the breech and an annular shoulder 26 formed within the enlarged end 19 of barrel 12. The barrel 12 has a knurled exterior surface 28 (FIG. 1) on its enlarged end 19 to facilitate gripping.

The barrel 12 and breech 14 cooperate to provide a continuous cylindrical bore 30 within the body of the stunning gun 10. A captive bolt 32 is received in the bore 30 for axially sliding movement between the retracted position shown in FIG. 2 and the extended position shown in FIG. 3. As best shown in FIG. 2, the leading end of bolt 32 has a recess 34 and a circular knife edge 36 which extends around the recess 34. The knife edge 36 facilitates penetration of the animal and particularly bony areas that are encountered. In the retracted position of the bolt, its leading end portion fits closely in a passage 38 which extends from the bore 30 and opens at the muzzle end 16 of the barrel. The passage 38 has a flared end 40 at the muzzle end of the barrel.

The bolt 32 is held in the retracted position by a detent mechanism formed by a bolt retaining metal collar 42. The collar 42 is generally frusto conical and is received in a chamber 44 formed within barrel 12 near the muzzle end 16. As best shown in FIG. 4, an access opening 46 in the bottom of barrel 12 connects with chamber 44 to permit the coller 42 to be inserted into the removed from chamber 44.

With continued reference to FIG. 4, the retaining collar 42 is acted upon by a small metal ball 47 which is urged toward the collar by a compression spring 48. The force of spring 48 urges collar 42 toward the skewed position shown in FIG. 4 wherein the inside surface 50 of the collar engages the knife edge 36 on the leading end of bolt 32. In this manner, the inside surface 50 of the collar acts against bolt 32 to serve as a retaining surface for holding the bolt in its retracted position.

Collar 42 is engaged on the side opposite ball 47 by a retaining pin 52 which extends across the access opening 46 and is received at its opposite ends in openings formed in the barrel 12. The retaining pin 52 has a smooth groove 54 in the shape of an hour glass at its center. Collar 42 enages the groove 54 to prevent the collar from moving beyond the position shown in FIG. 4. Pin 52 can be removed to permit collar 42 and the spring 48 and ball 47 to be removed for inspection and/or replacement. An oil passage 56 is provided for oiling of the spring and ball.

A breech cap 58 is applied to the breech 14 at the breech end of the gun body opposite the muzzle end 16. The breech is provided with external threads 60 that mate with internal threads 62 formed on the breech cap 58. The threads 60 and 62 are coarse threads, and each set of threads preferably includes three interrupted threads so that the breech cap can be threaded tightly onto the breech by turning the breech cap only about one half turn. Removal of the breech cap is equally easy and can be accomplished with one half turn in the opposite direction. When the breech cap 58 is tightened on the breech, an O-ring 64 is tightly squeezed between the end of the breech cap 58 and a shoulder formed on the breech. The exterior surface of the breech cap 58 is knurled to facilitate gripping of the stunning gun.

The tail or trailing end of bolt 32 carries a cylindrical piston 66 which fits in a or breech chamber 68 in the retracted position of the bolt. The breech chamber 68 is located within the breech 14 at the end of the bore 30. The piston 66 has an enlarged flange 70 which fits closely in the bore 30. Preferably, there is only a small clearance such as 0.005 inch between the flange and the walls surrounding the bore. A beveled surface 72 is formed at the intersection between the bore 30 and breech chamber 68, and a similarly beveled surface 74 is formed on the end of the piston 66. These beveled surfaces facilitate entry of the piston into the breech chamber when the bolt is moved to its retracted position.

A cartridge chamber 76 is formed in a neck portion 78 of breech 14 which projects beyond the threads 60. The cartridge chamber 76 extends from the breech chamber 68 to the end of the breech and has a diameter to closely receive an explosive cartridge 80. The cartridge 80 contains a suitable powder charge and has a crimped end 82 and an enlarged rim 84 on the opposite end. The cartridge 80 is a conventional rim fired cartridge.

The end face of piston 66 is provided with a cup shaped recess 86 (FIG. 2) which faces into the cartridge chamber 76 when the bolt is retracted. Surrounding the cupped recess 86 is an annular surface 88 formed on the end face of the piston. In the retracted position of the bolt, the annular surface 88 contacts an annular shoulder 90 formed within breech 14 at the intersection between the breech chamber 68 and the cartridge chamber 76.

Three grooves 91 are formed in the internal surface of breech 14 which surrounds the bore 30. Each groove 91 extends approximately one half the length of the breech and is located on end 20 of the breech. The grooves 91 are spaced equidistantly around bore 30 and are thus separated from one another by 120°, as best shown in FIG. 6.

A shell extractor 92 fits slideably on the neck portion 78 of breech 14. The shell extractor 78 serves to eject unfired or misfired shell cartridges and can be slid on neck 78 from the position shown in FIG. 2 to the position of FIG. 8. The extractor is a spool shaped member having a slot 94 extending through its end face, as shown in FIG. 9. Fitting in the slot 94 is an identically shaped boss 96 which projects from the end of neck 78. The rim 84 of a cartridge 80 loaded in the cartridge chamber fits in a counterbore 98 which is formed partially in the end face of the shell extractor 92 and partially in the boss 96. When the extractor 92 is slid to the rear as shown in FIG. 8, it pulls on the cartridge rim 84 to eject the cartridge from the cartridge chamber.

The extractor 92 is held on neck 78 by a plunger 100 having a body received in neck 78 and a smaller pin portion projecting into a slot 102 formed in the side of the extractor. A spring 104 urges plunger 100 outwardly to normally maintain the pin portion of the plunger in the slot 102, while the body of the plunger is too large to enter the slot. The plunger engages the end of the slot to prevent the extractor from moving beyond the position of FIG. 8. The plunger can be pushed inwardly against the force of spring 104 so that the entire plunger is located in the neck 78 to permit extractor 92 to be slid off of the end of the neck.

A plurality of annular buffers 108 are received in bore 30 to serve as cushions against which the enlarged flange 70 acts when the bolt reaches the fully extended position. The buffers are resilient to bounce the bolt back from its extended position. The buffers 108 loosely encircle bolt 32 and are removable from the gun when the breech 14 is disconnected from the barrel 12. Any desired number of buffers can be inserted into bore 30 in order to vary the stroke of the bolt and the depth to which it penetrates the animal. Preferably, the buffers 108 have varying degrees of hardness, with the buffers decreasing in hardness from the muzzle end of the barrel toward the breech.

The cartridges 80 are exploded by a firing pin 110 which slides axially in a bore 111 formed in the breech cap 58. The firing pin 110 can move axially between the cocked position shown in FIGS. 1 and 2 and the fired position shown in FIG. 3. In the fired position, a pointed tip 112 on the leading end of the firing pin 110 extends through a small passage 114 formed in a solid block portion 116 of the breech cap 58. The passage 114 has a tapered end which terminates adjacent to the rim 84 of a cartridge 80 loaded in the cartridge chamber 76. As best shown in FIG. 3, the pointed tip 112 of the firing pin projects slightly beyond the end of passage 114 in the fired position to contact the cartridge rim 84 and detonate the cartridge.

A compression spring 118 continuously urges the firing pin 110 toward the fired position. Spring 118 encircles the shank of the firing pin, and one end of the spring contacts an enlarged collar 120 formed on the firing pin. The other end of the spring contacts a spring cap 122 which is threaded onto a reduced end of the breech cap 58. The spring cap 122 is sealed to the breech cap 58 by an O-ring 124 and has a knurled exterior surface.

The firing pin 110 extends through an opening in the spring cap 122 and has its end located beyond the breech cap 58 at an accessible location to permit the firing pin to be pulled to its cocked position. A pull 126 is mounted on the projecting end of the firing pin 110. The pull has a flange 126a to facilitate gripping and a button 126b which can be used to return the bolt 32 to the retracted position. The pull 126 is threaded onto a pull bushing 128 which is sleeved onto the end portion of the firing pin 110. An O-ring 129 is squeezed between the pull 126 and the pull bushing 128. The pull and pull bushing are retained on the firing pin 110 by a split collar 130 which is fitted around a necked down portion 132 of the firing pin 110. The base end of the pull bushing 128 engages the split collar 130 to prevent the pull and pull bushing from sliding outwardly on pin 110 beyond the position of FIG. 2. However, the pull and pull bushing can slide inwardly on the end of pin 110 until the pull 126 engages the end of the firing pin. A compression spring is interposed between the end of the firing pin 110 and the pull 126 to continuously urge the pull outwardly or away from the end of the firing pin to the position of FIG. 2.

A push button trigger 136 holds the firing pin 110 in its cocked position and can be released to release the firing pin for movement to the fired position. The trigger has a generally cylindrical body 136a and an enlarged head 136b. The body 136a is received in a lateral passage 138 formed in the breech cap 58 to connect bore 112 with passage 114. A compression spring 140 continuously urges the trigger body 136a outwardly in passage 138 toward the engaged position of the trigger shown in FIG. 2. Spring 140 acts against the trigger body at one end and against the base of passage 138 at the other end. The trigger 136 can be pushed inwardly against the force of spring 140 to the release position shown in FIG. 3.

The trigger head 136b is located at an accessible position on one side of the breech cap 58. In the release position of the trigger, the head 136b seats against a flat surface 142 which is formed in the side of breech cap 58 at a recessed location. In the engaged position of the trigger, the head 136b is displaced only a short distance away from the flat surface 142 so that there is insufficient space for the operator's finger or other portion of the hand to become caught beneath the trigger head. The trigger head 136b has a smoothly rounded outer surface against which the finger is pressed to push the trigger inwardly to its release position.

An elongated opening or slot 144 is formed through the trigger body 136a. The opposite sides of the trigger body immediately below the slot 144 are flattened to provide flat shoulders 146 for catching a neck portion 148 of the firing pin located between the tip 112 and the collar 120. The neck 148 has the same size and shape as the slot 144 and fits closely through the slot when trigger 136 is in the release position. Slot 144 is then aligned with the firing pin 110. In the engaged position of the trigger shown in FIG. 2, the slot 144 is misaligned with the firing pin such that the leading surface of neck 148 catches on one of the shoulders 146 to maintain the firing pin 110 in its cocked position.

In use, the stunning gun 10 is prepared for firing by removing the breech cap 58 from the breech 14 and applying the button 126b on pull 126 to the leading end of bolt 32 to push the bolt inwardly to its fully retracted position. Once the bolt has been fully retracted, it is held in place by the retaining collar 42. As the piston 66 approaches the breech chamber 68, the air pressure builds up and acts against the spent cartridge casing in the cartridge chamber 76 to automatically eject the casing. After a new cartridge 82 has been inserted into the cartridge chamber 76, the breech cap 58 can be threaded onto the breech 14.

The firing pin 110 can be cocked by grasping the pull 126 and pulling outwardly on the firing pin until the neck 148 of the firing pin has been removed completely from the slot 144. At this time, spring 140 extends trigger 136 to the engaged position shown in FIG. 2. The gun can be fired by holding it in either hand, preferably with the fingers applied to the knurled surface of the breech cap and the index finger on the rounded outer surface of the trigger head 136b. The muzzle end 16 of the barrel is then placed against the head of the animal, and the trigger is pressed inwardly to the release position. Spring 118 causes the firing pin 110 to move to the fired position to forcefully apply the tip 112 to the cartridge rim 84, thus detonating the cartridge.

The contact of the annular end surface 88 of the piston 66 against the shoulder surface 90 initially confines the explosive force to the recess 86. The explosive force is thus fully applied to the piston 66 and propels bolt 32 into the head of the animal in a forceful manner. The provision of the recess 86 and the surrounding annular surface 88 prevents the explosive force from spreading out around the end of the piston to cause erosion of the breech chamber walls, and it also assures that the explosive force is efficiently applied to the piston rather than to other parts of the stunning gun. At the same time, the cupped configuration of the recess 86 causes the combustion gases to swirl and thus mixes them thoroughly and results in a more complete burn and reduced build up of carbon residue and other undesirable deposits that could otherwise foul the firing chamber.

During the initial extension of the bolt 32, the close fit of the piston 66 in the breech chamber 68 and the close fit of the flange 70 in bore 30 confines the combustion gases and assures that they work against the piston to cause extension of the bolt. However, once the bolt has been extended approximately half way, the flange 70 reaches the grooves 91 which thereafter provide a vent path for the combustion gases to relieve the pressure behind the piston. At the end of the stroke of bolt 32, flange 70 contacts the resilient buffers 108 and is caused to bounce back such that the leading end of the bolt 32 is automatically withdrawn from the head of the animal. The gases which are relieved through grooves 91 assist the buffers in providing a cushion effect at the end of the stroke, and the grooves also permit easy withdrawal of the bolt because they relieve the back pressure behind the piston, In addition to providing access to the collar 42 and related components, the access opening 46 allows escape of the combustion gases.

The breech cap 58 can then be detached from breech 14, and the button 126b can be inserted into recess 34 on the leading end of the bolt to assist in pushing the bolt back to its retracted position. After the flange 70 has cleared the grooves 106, the air pressure begins to build up in the breech chamber 68 and cartridge chamber 76 to automatically eject the spent cartridge in the cartridge chamber. If the shell is jammed or stuck, the cartridge extractor 92 can simply be slid to the rear to remove the cartridge. The extractor 92 can also be used to remove unfired or misfired cartridges.

The action of the bolt retaining collar 42 firmly holds the bolt 32 in its retracted position and yet does not hamper extension of the bolt when the gun has been fired. The lost motion connection of the pull 126 on the firing pin 110 enhances the safety of the gun in that blows applied to the end of the pull cause the pull to slide inwardly on the firing pin rather than acting directly on the firing pin. Consequently, if the gun is accidentally dropped or otherwise carelessly handled such that blows are applied to the end of the pull, the gun will not fire inadvertently. The spring 134 also provides an effective shock absorber when the button 126b is used to return the bolt to its retracted position.

The coarse thread connection between the breech 14 and breech cap 58 permits the breech cap to be quickly applied to and removed from the breech. Unless the breech cap is fully threaded onto the breech, the gun cannot be fired since the firing pin tip 112 will not reach the cartridge rim 84 unless the breech cap is fully applied.

In the fired position of the firing pin 110, its neck 148 is received closely in the slot 144 so that the trigger 136 cannot be engaged unless and until the firing pin has been intentionally pulled to the fully cocked position. Then, both of the springs 118 and 140 maintain the leading surface of neck 148 firmly against the shoulder 146. The rounded outer surface of the trigger head 136b provides a smooth and large surface against which the finger can be pressed to push the trigger to the release position. The overall construction and configuration of the push button type trigger 136 results in easy and safe operation of the trigger without the possibility of the finger or other part of the hand catching on the trigger.

As previously indicated, the recess 86 in the piston face results in the driving force being concentrated for effective extension of the bolt. At the same time, the cupped shape of the recess increases the combustion efficiency by creating a swirling motion of the gases which assures a more complete burn. The overall result is more efficient combustion, more effective use of the combustion force, reduced deterioration of the firing chamber, and less build up of carbon and other undesirable deposits.

The gun 10 can be quickly and easily disassembled for inspection and/or servicing because of the convenient access that is provided to all of its components. The various O-rings used between the threaded parts and the lock washer 24 assist in locking the parts together while permitting them to be unthreaded without undue difficulty.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A stunning gun comprising:
    a gun body having a muzzle end and a breech end and a bore between the muzzle and breech ends, said body presenting at the breech end thereof a cartridge chamber for receiving an explosive cartridge;
    a bolt mounted in said bore for axial movement between an extended position and a retracted position, said bolt having a leading end located beyond the muzzle end in the extended position and a trailing end located adjacent the cartridge chamber in the retracted position;
    a breech cap on the breech end of said body;
    a firing pin in said breech cap for exploding a cartridge upon impact therewith;
    trigger means for effecting movement of said firing pin against a cartridge in the cartridge chamber to effect explosion of the cartridge and forceful propulsion of the bolt from the retracted position to the extended position;
    a a rigid collar encircling said bolt for releaseably retaining said bolt in the retracted position, said collar being mounted in said body at the muzzle end thereof for limited movement and presenting an inside surface engageable with the leading end of said bolt to maintain the bolt in the retracted position; and
    biasing means acting against said collar on one side thereof for biasing said collar toward a skewed position wherein said inside surface acts against the leading end of the bolt to retain the bolt in the retracted position, said biasing means being yieldable to permit said leading end of the bolt to release from said inside surface as the bolt is propelled toward the extended position.

2. The invention of claim 1, including:
an access opening in said body providing access to said collar for removal thereof; and
removable retaining element in said body acting to maintain said collar substantially in alignment with said bolt, said retaining element being removable to permit said collar to be removed through said access opening.

3. The invention of claim 1, wherein said biasing means includes:
a ball element adjacent said collar; and
spring means for pushing said ball element against said one side of the collar to urge the inside surface of the collar against said bolt.

4. A stunning gun comprising:
a gun body having a muzzle end and a breech end and a bore between the muzzle and breech ends, said body presenting at the breech end thereof a cartridge chamber and a breech chamber;
an annular shoulder surface on said gun body located internally thereof at the intersection between said cartridge and breech chambers;
a bolt mounted in said bore for axial movement between a retracted position and an extended position wherein the bolt projects beyond the muzzle end of said body;
a piston on said bolt fitting closely in said bore and having an end face presenting a recess facing into the cartridge chamber and an annular end surface extending around said recess and contacting said shoulder surface in the retracted position of said bolt, whereby contact of said end surface against said shoulder surface causes the force applied upon explosion of a cartridge in said cartridge chamber to be initially confided to said recess to explosively propel said bolt to the extended position thereof;
a breech cap on the breech end of said body;
a firing pin in said breech cap for effecting explosion of a cartridge in said cartridge chamber; and
trigger means for moving said firing pin forcefully against a cartridge in the cartridge chamber to explode the cartridge;
a projecting end of said firing pin extending out of said breech cap;
a pull member on said projecting end of the firing pin to facilitate pulling of the firing pin, said pull member having an end portion located longitudinally outwardly of said projecting end of the firing pin; and
a spring interposed between said pull member and said projecting end of the firing pin to absorb forces applied to said end portion of the pull member.

5. The invention of claim 1, including:
a projecting end of said firing pin extending out of said breech cap;
a pull member on said projecting end of the firing pin to facilitate pulling of the firing pin, said pull member having an end portion located longitudinally outwardly of said projecting end of the firing pin; and
a spring interposed between said pull member and said projecting end of the firing pin to absorb forces applied to said end portion of the pull member.

6. A stunning gun comprising:
a gun body having a muzzle end and a breech end and a bore between the muzzle and breech ends, said body presenting at the breech end thereof a cartridge chamber adapted to hold an explosive cartridge;
a bolt mounted in said bore for axial movement between an extended position and a retracted position, said bolt projecting beyond said muzzle end in the extended position;
a breech cap on the breech end of said body;
a firing pin mounted in said breech cap for movement toward and away from said cartridge chamber between a fired position and a cocked position;
pull means for pulling of the firing pin away from said cartridge chamber to the cocked position;
a trigger supported for generally lateral movement out of and into the breech cap between an engaged position wherein the firing pin is held in the cocked position and a release position wherein the firing pin is released for movement to the fired position;
an enlarged head portion of said trigger accessible on one side of the breech cap for inward pushing of the trigger from the engaged position to the release position, said head portion being in contact with said one side of the breech cap in the release position and being displaced from said one side in the engaged position by a distance presenting insufficient space for the finger of the operator of the gun to be inserted between said head portion and said one side of the breech cap;
yieldable means for urging said firing pin toward the fired position to effect explosion of a cartridge shell when said trigger is pushed to the release position, thereby forcefully propelling said bolt to the extended position;
said bolt having a leading end;
a rigid collar mounted in said body for limited lateral movement and encircling said bolt, said collar having an inside surface for engaging said leading end of the bolt to retain the bolt in its retracted position; and
resilient means acting against said collar on one side thereof in a manner to urge said collar toward a skewed position wherein said inside surface thereon acts against said leading end of the bolt to hold the bolt in its retracted position, said resilient means yielding to permit the leading end of the bolt to release from said retaining surface as the bolt moves to the extended position in response to explosion of a cartridge in said cartridge chamber.

* * * * *